United States Patent [19]
de Vries et al.

[11] 3,879,173
[45] Apr. 22, 1975

[54] CRYSTALLISER FOR CONTINUOUSLY OBTAINING OF CRYSTALS

[76] Inventors: Gerbertus H. de Vries, Grondherenstraat 6, Rotterdam; Gerrit C. de Bruyn, Binkschotenlaan 242 5r, B200 Borgerhout, Antwerpen, both of Belgium

[22] Filed: Dec. 26, 1972

[21] Appl. No.: 318,411

Related U.S. Application Data
[63] Continuation-in-part of Ser. No. 61,636, Aug. 6, 1970, abandoned.

[30] Foreign Application Priority Data
Sept. 26, 1969 Netherlands .................. 6914626

[52] U.S. Cl. .................. 23/301 R; 23/300
[51] Int. Cl. .................. B01j 17/00; B01j 17/20
[58] Field of Search ...... 23/273 R, 273 F, 295, 300, 23/301 R, 270 R; 202/173, 174; 159/45, 34, 26 A

[56] References Cited
UNITED STATES PATENTS

| | | |
|---|---|---|
| 2,569,357 | 9/1951 | Vahl .................. 23/301 R |
| 2,743,996 | 5/1956 | Hachmuth .................. 23/273 R |
| 2,778,717 | 1/1957 | Decker .................. 23/301 R |
| 3,199,958 | 8/1965 | Skogh .................. 23/270 R |
| 3,337,419 | 8/1967 | Kogan .................. 202/173 |
| 3,389,059 | 6/1968 | Goeldner .................. 203/7 |
| 3,396,086 | 8/1968 | Starmer .................. 203/7 |
| 3,547,597 | 12/1970 | Hays .................. 23/301 R |

*Primary Examiner*—A. Louis Monacell
*Assistant Examiner*—Darrell Sanders
*Attorney, Agent, or Firm*—Snyder, Brown and Ramik

[57] ABSTRACT

A series of upstanding vessels are connected in serial flow relation, the first vessel receiving mother liquor with seed crystals at its lower end and the last vessel discharging mother liquor enriched in large crystals. Each vessel is exhausted of vapor at its upper end and the inclinations of the vessels are adjusted to provide the requisite pressure gradients to assure progressive growth of the seed crystals without forming new seed crystals.

4 Claims, 8 Drawing Figures

INVENTOR
GERBERTUS H. DE VRIES
and
GERRIT C. DE BRUYN

BY

ATTORNEY

CRYSTALLISER FOR CONTINUOUSLY OBTAINING OF CRYSTALS

CROSS REFERENCE TO RELATED APPLICATION

This application is a continuation-in-part of copending application Ser. No. 61,636, filed Aug. 6, 1970 and now abandoned.

The invention relates to a crystalliser for continuously obtaining crystals from a saturated solution containing seeding crystals.

It is an object of the invention to provide a crystalliser of the kind specified which enables the conditions of crystallisation to be adapted to requirements to an extent hitherto unattainable. To this end according to the invention the crystalliser comprises at least one oblong vessel whose longitudinal axis forms an angle with the horizontal plane and which has, at least, a connection for supplying the saturated or substantially saturated solution adjacent its bottom end, a discharge for saturated solution with the crystals formed therein at its top end, and a discharge aperture for the vapour formed in the vessel at its highest point; a free passage is provided through which the vapour formed in the liquid passes to the vapour discharge aperture; means are provided to ensure that the crystals formed are conveyed to the discharge aperture for the solution and crystals; and means are provided for regulating the pressure at the vessel inlet and outlet ends. When with a crystalliser of the kind specified a difference in pressure over the liquid column in the crystalliser is applied such that the absolute pressure at the bottom of the tubular crystalliser remains below the vapour pressure associated with the temperature of the saturated solution supplied, the solution boils at the bottom of the crystalliser, so that the solution is supersaturated and crystallisation starts. During flow the pressure gradually decreases in the upward direction so that the solution continues to boil, even though the temperature drops. Cooling takes place due to vaporisation, and therefore the supersaturation is maintained, so that crystallisation continues. Moreover, inspissation reliably takes place. With a liquid column of any particular length, the course of pressure can be adjusted by correctly selecting the angle made by the crystalliser longitudinal axis with the horizontal plane.

In one convenient embodiment of the crystalliser according to the invention, the oblong vessel is mounted with provision for roation around a horizontal axis directed transversely of the vessel longitudinal axis, and means are provided for adjusting the angle which the vessel longitudinal axis makes with the horizontal plane. With a construction of this kind no preliminary adjustment is required, since the correct value of the angle can be adjusted in dependence on circumstances.

In another embodiment of the invention the oblong vessel consists of two or more parts so co-operating with one another telescopically in pairs via a cylindrical member having seals that the length of the vessel can be adjusted. The residence time of the solution can be adjusted by lengthening or shortening the oblong vessel, for any speed of flow of the solution through the crystalliser. If, with a constant angle between the vessel axis and the horizontal surface and a constant adjusted pressure above the level of the solution in the crystalliser the vessel is lengthened by extension, the whole process can be displaced in the direction of flow. For instance, the place where seeding crystals are supplied can be raised in height merely by causing the supersaturation to reach the required value further up in the crystalliser. By rotating the vessel through an angle, while at the same time adjusting its length, so that the vertical projection of the liquid column in the crystalliser remains the same, while the constant pressure on the liquid surface in the crystalliser is maintained and a constant speed of flow is also kept up, the vaporising speed and therefore the cooling speed can be so regulated as to enable the course of supersaturation to be adjusted over the liquid column.

In one embodiment of the invention the crystalliser consists of a number of vessels connected in series, and the means for adjusting the angle which the longitudinal axis of each vessel makes with the horizontal plane are connected to one another. By using the various vessels the conditions of crystallisation and more particularly the course of supersaturation can be fixed at different places in the crystalliser at a value which is independent of, for instance, the conditions at the start of the crystalliser.

In another embodiment of the invention the crystalliser has a number of extra supply connections for fresh saturated solution which are disposed in offset relationship to one another in the direction of flow. With a crystalliser of this kind merely a portion of the saturated solution can be supplied to the inlet end, such portion containing the necessary quantity of seeding crystals, the remainder of the saturated solution being supplied via the extra connections, the result being a much more constant rate of crystal growth.

According to another feature of the invention at least over a portion of the crystalliser the flow throughput increases in the direction of flow. Although fresh supersaturated solution is supplied via the various extra connections, the residence time in the successive parts of the crystalliser can therefore be kept identical or substantially identical. For instance, the flow throughput can be increased by making the crystalliser conical or by connecting a number of cylindrical parts in series, each successive part having a larger diameter than the preceding one. A conical core can also be used with a cylindrical vessel.

According to one feature of the invention discs are disposed on a driven rotary shaft which are formed with projections for improving the agitating and/or conveying action and leave a passage free for the vapour formed and the solution containing the crystals. The discs can divide the crystalliser into a number of portions each having its own supply connection. The projections ensure that there is substantially no temperature gradient inside each part of the vessel, so that the temperature of the solution in such part is in accordance with the absolute pressure at the top thereof.

According to another possible feature of the invention each vessel has one or more helically extending surfaces which are disposed on a drive shaft mounted eccentrically of the vessel longitudinal exis, extend to adjacent the bottom generatrix of the vessel and are eliminated over a certain distance from the top generatrix therefrom, so that crystals can be conveyed along the vessel bottom wall and the vapour formed can move unimpeded along its top wall. With a construction of this kind, if the crystals drop out they are conveyed to the discharge aperture by the helical surfaces, while the agitating mechanism allows the vapour to pass unimpeded.

According to another possible feature of the invention the shaft has drive means via which it can be driven at an adjustable speed, so that the conveying speed caused by the helically extending surfaces agrees with the speed of flow determined by the supply and discharge speed of the solution. This feature obviates any undesirable currents, while the conveying of the crystals formed is adapted to the speed of flow of the solution.

According to another possible feature of the invention means are provided for supplying heat to the crystalliser. The crystalliser can have a steam jacket, and the helically extending surfaces can form part of a hollow screw to which steam can be supplied.

A number of embodiments of the invention will now be described in greater detail with reference to the drawings, wherein.

Figure 1:
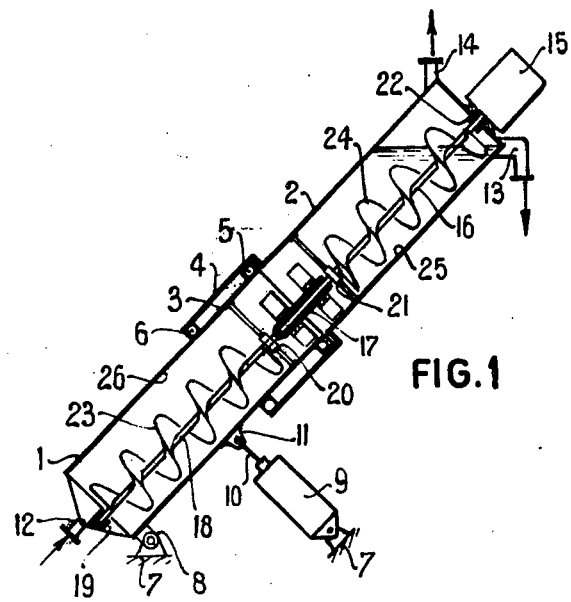
FIG. 1 shows a crystalliser according to the invention.

Reffering to FIG. 1, a crystalliser is constructed in the form of an oblong vessel consisting of two parts 1, 2 having telescopically co-operating parts 3, 4 having seals 5, 6. The length of the crystalliser can be adjusted by displacing the parts 1, 2 in relation to one another. The part 1 is attached to a fixed frame 7 via the agency of a horizontal hinge 8. A hydraulic cylinder 9 is also pivotably attached to the frame 7. Piston rod 10 of the cylinder 9 is hingeably connected at a place 11 to the part 1. The inclination of the crystalliser 1, 2 can be adjusted via the agency of the cylinder 9. A supply connection 12 for a saturated solution containing seeding crystals is disposed at the bottom end of the crystalliser. Adjacent its top end the crystalliser has a discharge connection 13 through which the solution containing the formed crystals can overflow. At its top point the crystalliser has a vapour discharge connection 14. A motor 15 disposed on the crystalliser can drive a shaft 16 connected via a thrust member 17 to a shaft 18 which is supported in bearings 19, 20, the shaft 16 being supported in bearings 21, 22. The shaft 18 has a helically extending surface 23, the shaft 16 having a surface 24 of matching shape. The shafts 16, 18 are disposed somewhat eccentrically, the helically extending surfaces 23, 24 extending to adjacent the bottom generating line 25 of the crystalliser. A fairly large space is left adjacent the top generating line 26.

When a saturated solution containing seeding crystals is supplied via the connection 12 and the pressure above the liquid is such that the pressure at the bottom of the crystalliser is lower than the vapour tension associated with the inlet temperature, the saturated solution supplied vaporises, so that the seeding crystals start to grow. Since the pressure of the liquid gradually decreases as it flows upwards, the self-vaporisation is maintained. The resulting cooling maintains the supersaturation at the required level and the crystals continue to grow. Moreover, as a result of the vaporisation inspissation continues, and this also contributes to maintaining the supersaturation at the required level. The conditions in which self-vaporisation occur can be changed as required by adjusting the inclination and length of the crystalliser.

Figure 2:
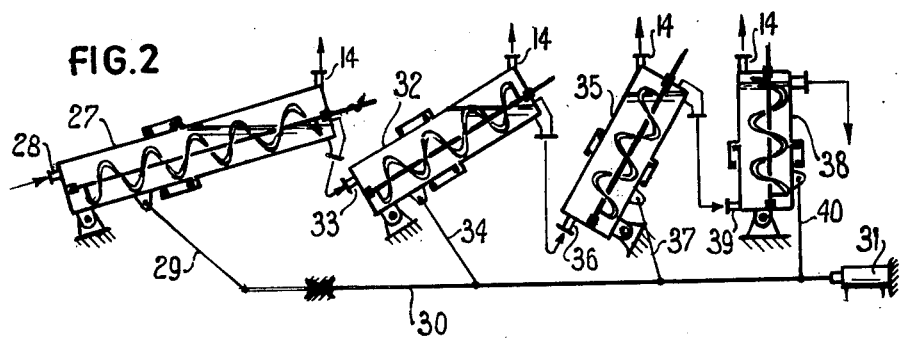
FIG. 2 shows a number of crystallisers similar to those illustrated in FIG. 1 connected in series.

FIG. 2 shows a crystalliser built up from a number of component crystallisers as shown in FIG. 1. Like parts of the crystalliser to those shown in FIG. 1 have like references. The first component crystalliser 27 has a supply connection 28 to which saturated liquid containing seeding crystals can be supplied. The position of the component crystalliser 27 can be adjusted via the agency of an operating rod 29 connected to an operating rod 30 connected to the moving member of a servo cylinder 31. The following component crystalliser 32 has a supply connection 33 via which the liquid containing the crystals formed in the crystalliser 27 can enter the crystalliser 32. The inclination of the crystalliser 32 can be adjusted via the agency of an operating rod 34 connected to the operating rod 30. In similar manner, a crystalliser 35 is disposed downstream of the crystalliser 32, the supersaturated solution coming from the crystalliser 32 entering the crystalliser 35 at a place 36. An operating rod 37 for adjusting the inclination of the crystalliser 35 is connected to the common operating rod 30. The apparatus terminates with a crystalliser 38 to which liquid coming from the crystalliser 35 can be supplied via a connection 39. The inclination of the crystalliser 38 can be adjusted via the agency of an operating rod 40 connected to the common operating rod 30. In the crystalliser illustrated in FIG. 2, the crystallisers 27, 32, 35 and 38 can be simultaneously adjusted via the agency of the servo cylinder 31. The various crystallisers are then inclined at different angles, so that the conditions of crystallisation can be adjusted at the inlet end of the complete crystalliser independently of the conditions at the discharge end thereof. Care must be taken that the pressure at the inlet end of each successive component crystalliser is at most equal to the pressure at the discharge end of the preceding component crystalliser. The pressure at the discharge end of crystalliser 27 must therefore, for instance, be equal to the pressure at the inlet end 33 of crystalliser 32.

Figure 3:
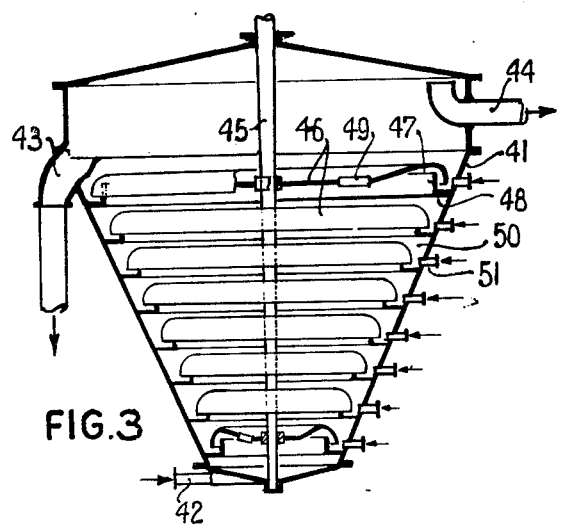
FIG. 3 shows a variant embodiment of a crystalliser.

FIG. 3 shows a crystalliser based on the same principle but of different construction. The crystalliser shown in FIG. 3 consists of a conical vessel 41 which has adjacent its downwardly pointing end of minor diameter a supply connection 42, adjacent its top a discharge connection 43 for supersaturated solution containing crystals, and at its highest point a discharge connection 44 for the vapour formed in the crystalliser. The inclination of the crystalliser cannot be adjusted. The crystalliser longitudinal axis makes an angle of 90° with the horizontal plane. Extending inside the vessel 41 is a driven rotary shaft 45 on which discs 46 after the fashion of overturned dishes are disposed whose turned-down top edges engage around vertical edges 47 of channel-formed members 48 extending along the inside periphery of the vessel 41 and are formed with apertures 49 through which the solution can pass. The discs 46 subdivide the crystalliser 41 into portions 50. Each portion 50 has its own supply connection 51 for saturated solution without seeding crystals. The discs 46 can also be formed with projections (not shown in detail) for producing a satisfactory conveying and agitating action. By keeping the liquid in motion in the sections a homogeneous temperature can be obtained in each section, while preventing the crystals formed from falling out.

Due to the vertical liquid column formed inside the crystalliser the static pressure decreases gradually, so that the self-vaporisation of the solution as it flows through the crystalliser is maintained.

This crystalliser has the great advantage of enabling the rate of growth of the crystals to be substantially constant. In the embodiment illustrated, one-ninth of the available quantity of saturated solution is supplied via the connection 42. The seeding crystals are fed to this portion of the supersaturated solution supplied via the connection 42. A further one-ninth of the available supersaturated solution is supplied to each section 50 via the connections 51. The supersaturated solution supplied via the connections 51 contains no seeding crystals.

Figure 4:
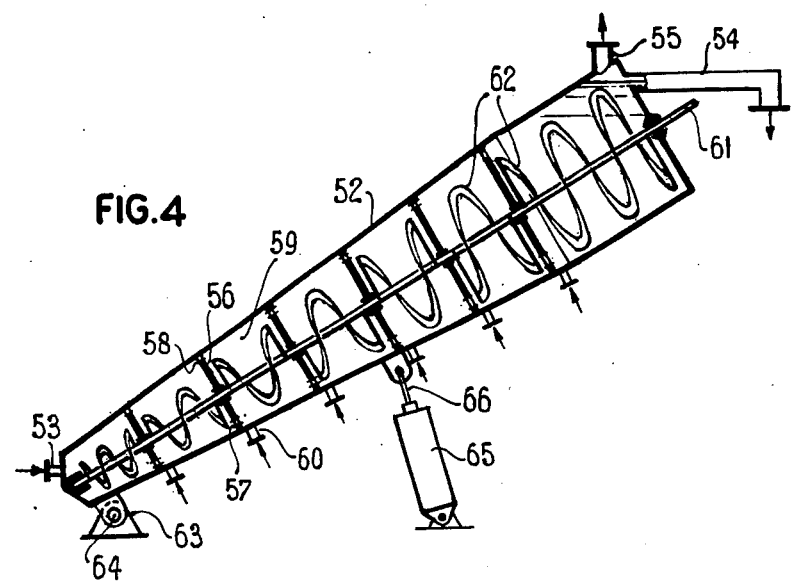
FIG. 4 shows a conical crystalliser.

FIG. 4 shows a crystalliser which, just like the crystalliser illustrated in FIG. 3, is conical and subdivided into a number of sections having separate supply connections. The crystalliser is formed by a conical vessel 52 having a supply connection 53 for saturated solution containing seeding crystals, a discharge connection 54 for supersaturated liquid containing the crystals formed, and a discharge connection 55 for the vapour formed. The vessel 52 is subdivided into sections 59 via the agency of fixed discs 56 formed with apertures 57 through which the saturated solution can pass and apertures 58 for the passage of the vapour formed. Each section 59 has its own supply connection 60 for saturated solution. Extending through the crystalliser is a driven rotary shaft 61 having inside each section an agitating mechanism 62 for producing a uniform temperature inside each section and encouraging the conveying of the crystals formed through that section to the following section. The crystalliser is hingeably attached to a horizontal shaft 64 at a place 63. The inclination of the crystalliser can be adjusted via the agency of a servo cylinder 65 whose piston rod 66 is hingeably connected to the crystalliser. In a similar manner as with the crystalliser shown in FIG. 3, one-seventh of the total available amount of saturated solution can be supplied via the connection 53, such portion of the solution containing the seeding crystals. One-seventh of the available quantity of saturated solution containing no seeding crystals is supplied to each section via the connections 60.

Figure 5:
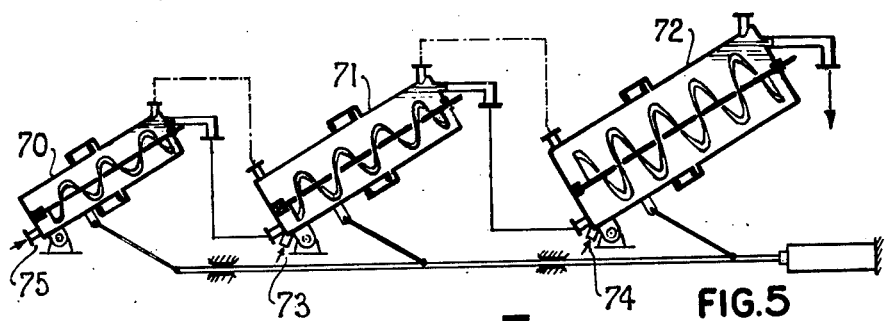
FIG. 5 shows a composite crystalliser in which the component crystallisers have increasing diameters.

FIG. 5 shows an embodiment of a crystalliser similar to that shown in FIG. 2, but in which the component crystallisers 70-72 are of increasing diameters. The crystallisers 71, 72 have adjacent their bottom ends an extra connection 73, 74 respectively via which saturated solution containing no seeding crystals is supplied. Saturated solution containing seeding crystals is supplied to the crystalliser 70 via connection 75. Two-thirds of the available quantity of saturated solution is supplied to the crystallisers 71, 72 via connections 73, 74. The relationship between the diameters of the crystallisers 70, 71 and 72 is such that the time spent by the solution therein is identical.

Figure 6:
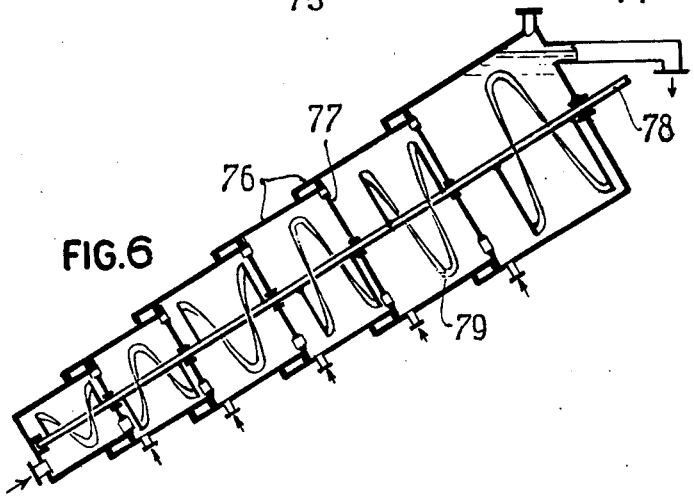
FIG. 6 shows a second variant embodiment of a crystalliser.

FIG. 6 shows a crystalliser which, just like the embodiment shown in FIG. 4, has an increasing diameter. The crystalliser illustrated in FIG. 6 is built up from telescopically co-operating cylindrical parts 76. Disposed between the various cylindrical parts is a partition consisting of discs 77 which, just as in the embodiment illustrated in FIG. 4, are formed with apertures, agitating members 79 being disposed on a driven rotary shaft 78. The supply of the saturated solution can be distributed over a number of supply connections.

Figure 7:
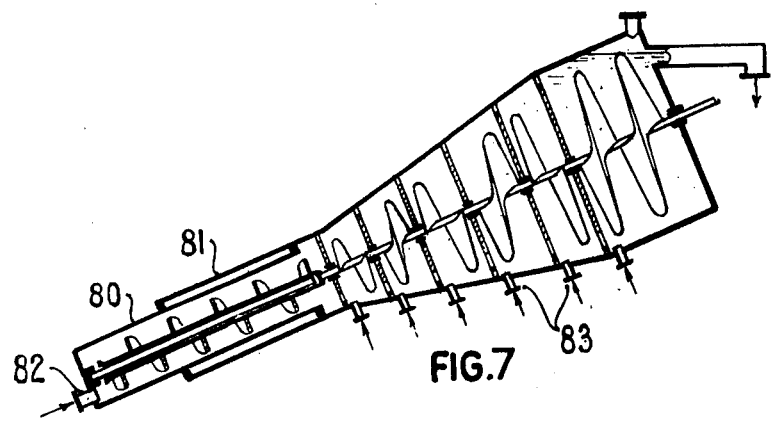
FIG. 7 shows a third variant embodiment of a crystalliser.

In the embodiment illustrated in FIG. 7, the crystalliser is built up from two telescopically co-operating parts 80, 81 having attached thereto a conical crystalliser constructed as shown in FIG. 4. In the embodiment illustrated in FIG. 7 the parts 80, 81 can be displaced in relation to one another, so that the residence time in the first part of the crystalliser can be adjusted, a feature of importance for the start of crystallisation. One-seventh of the saturated solution containing the seeding crystals can be supplied to the part 80, 81 via supply spigot 82. One-seventh of the supersaturated solution containing no seeding crystals is then supplied to each of the various sections via spigots 83. The crystalliser also has discharge spigots and helically extending surfaces disposed on a driven rotary shaft which act as agitating and conveying members.

Figure 8:
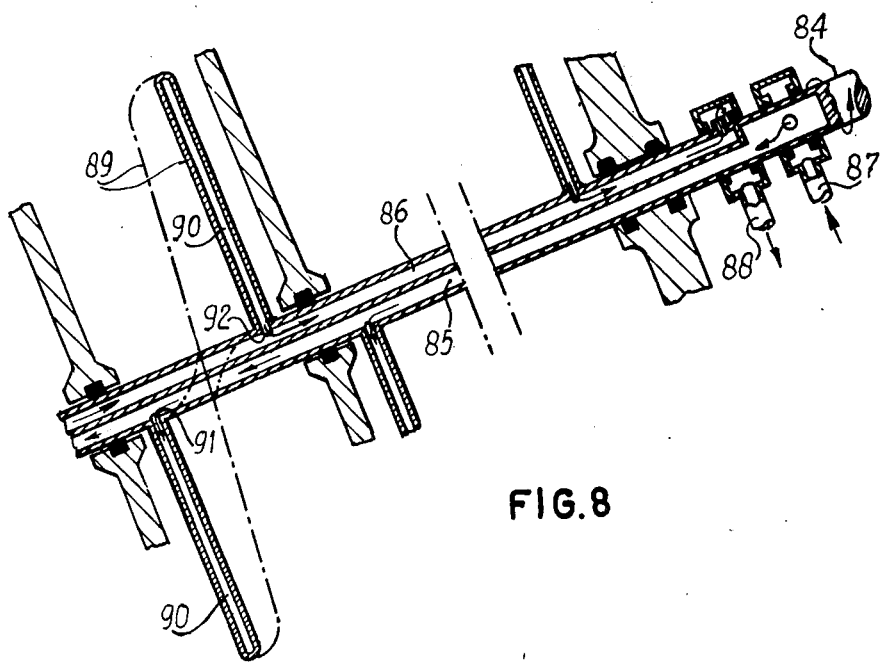
FIG. 8 is a detail, to an enlarged scale, of the crystalliser shown in FIG. 7.

FIG. 8 shows a detail of a crystalliser according to the invention. In this embodiment the crystalliser has means for supplying extra heat. In the embodiment shown in FIG. 8, this is done by the shaft 84 to which the agitating members are attached being hollow and having two passages 85, 86 to which a heating medium, for instance, steam can be supplied via a supply connection 87. The heating medium in the form of, for instance, steam or condensate can be removed via connection 88. Helically extending hollow blades 89 are disposed on the shaft 84. A hollow space 90 is connected to the passage 85 via an aperture 91 and to the passage 86 via an aperture 92. The heating medium supplied therefore flows through the hollow helically extending blades 89, so that heat can also be supplied to the liquid as required during the agitating and conveying action exerted on the liquid in the crystalliser.

Heat can of course also be supplied via a jacket around the crystalliser, or by blowing steam direcly into the liquid.

We claim:

1. A method of growing crystals from mother liquor, which comprises the steps of:
   a. forming an elongate, unidirectionally flowing liquid column by continuously introducing saturated mother liquor containing seed crystals into the lower end of an elongate vessel while continuously withdrawing saturated mother liquor containing grown crystals and vapor separately from the upper end of the vessel;
   b. controlling the temperature of the entering mother liquor, the height of the liquid column and the pressure of vapor withdrawal such that the entering mother liquor boils and boiling continues throughout the liquid column uniformly to maintain supersaturation of the mother liquor and progressive growing of the seed crystals;
   c. transporting the growing crystals cocurrently with the mother liquor by rotating a helical auger within said liquid column; and
   d. controlling the rotational speed of said auger with respect to the flow rate of mother liquor in said column such that the growing crystals are transported at said flow rate and whereby movement of said mother liquor is effected by said auger only transverse to the flow path from the lower to the upper end of said vessel.

2. A method of growing crystals as defined in claim 1 wherein the height of the liquid column is controlled by adjusting the inclination of said vessel.

3. A method of growing crystals as defined in claim 1 including the steps of forming a second elongate, unidirectionally flowing liquid column by introducing the saturated mother liquor and grown crystals discharged for the vessel of step (a) into the lower end of a second vessel while continuously withdrawing saturated mother liquor containing grown crystals and vapor separately from the upper end of the second vessel, and effecting steps (b) – (d) in said second liquid column.

4. A method as defined in claim 3 wherein the height of the first and second liquid columns are controlled by adjusting the inclinations of said first and second vessels.

* * * * *

UNITED STATES PATENT OFFICE
CERTIFICATE OF CORRECTION

PATENT NO. : 3,879,173
DATED : April 22, 1975
INVENTOR(S) : Gerbertus H. deVries and Gerrit C. de Bruyn It is certified that error appears in the above-identified patent and that said Letters Patent are hereby corrected as shown below:

[73] Assignee: Stork-Werkspoor Sugar B.V. of Hengelo,
the Netherlands and
Suiker Unie Holding N.V. of Rotterdam,
the Netherlands Signed and Sealed this sixteenth Day of December 1975

[SEAL]

Attest:

RUTH C. MASON
Attesting Officer

C. MARSHALL DANN
Commissioner of Patents and Trademarks